United States Patent
Blonski et al.

(10) Patent No.: US 6,923,090 B2
(45) Date of Patent: Aug. 2, 2005

(54) DEVICE FOR TEMPORARILY LOCKING A ROTOR, IN PARTICULAR A MAGNETICALLY SUSPENDED ROTOR OF AN INERTIA WHEEL FOR SPACE APPLICATIONS

(75) Inventors: Daniel Blonski, Leiden (NL); René Seiler, Oegstgeest (NL)

(73) Assignee: Organisation Intergouvernementale Dite Agence Spatiale Europeenne, Cedex (FR)

( * ) Notice: Subject to any disclaimer, the term of this patent is extended or adjusted under 35 U.S.C. 154(b) by 308 days.

(21) Appl. No.: 10/400,391

(22) Filed: Mar. 28, 2003

(65) Prior Publication Data

US 2003/0183035 A1 Oct. 2, 2003

(30) Foreign Application Priority Data

Mar. 29, 2002 (FR) ............................................. 02 03996

(51) Int. Cl.[7] ............................................. F16H 27/00
(52) U.S. Cl. ........................................... 74/572; 74/436
(58) Field of Search ............................... 74/5.1, 5.2, 5.7, 74/84 R, 411.5, 434, 436, 572; 310/74

(56) References Cited

U.S. PATENT DOCUMENTS

| | | | |
|---|---|---|---|
| 2,363,167 A | * 11/1944 | Daniels | 210/89 |
| 3,446,082 A | * 5/1969 | Turnblade et al. | 74/5.12 |
| 4,345,485 A | 8/1982 | Livet et al. | |
| 4,566,740 A | 1/1986 | Beau et al. | |
| 4,848,169 A | * 7/1989 | Duncan et al. | 74/5 F |
| 4,872,357 A | 10/1989 | Vaillant De Guelis | |
| 5,474,263 A | * 12/1995 | Ford et al. | 244/165 |

* cited by examiner

Primary Examiner—William C. Joyce
(74) Attorney, Agent, or Firm—Miles & Stockbridge P.C.; Edward J. Kondracki (57) ABSTRACT

According to the invention, a "Geneva" movement mechanism is used which is turned in one direction or the other by an electric motor. The mechanism comprises a "Maltese" cross turning about the axis of rotation of the rotor and supporting an annular piece. The Maltese cross is mechanically coupled to a ball screw lying on said axis of rotation so as to transform the turning notion into motion that includes a linear component, thereby enabling the annular piece to be moved at will towards and away from the rotor so as to make it possible to obtain contact and then blocking in a self-blocking manner against a fixed wall, or on the contrary so as to release the rotor by moving the annular piece in translation in the opposite direction. The invention is applicable to an inertia wheel for controlling the attitude of a satellite.

16 Claims, 3 Drawing Sheets

DEVICE FOR TEMPORARILY LOCKING A ROTOR, IN PARTICULAR A MAGNETICALLY SUSPENDED ROTOR OF AN INERTIA WHEEL FOR SPACE APPLICATIONS

FIELD OF THE INVENTION

The invention relates to a device for temporarily locking a rotor, i.e. for enabling the rotor to be locked and unlocked, and in particular the magnetically suspended rotor of an inertia wheel.

More particularly, the invention applies to space technologies, and even more particularly it applies to controlling the attitude of artificial satellites, for example satellites orbiting the Earth, whether geostationary or otherwise.

In the context of the invention, the term "inertia wheel" should be understood in its most general sense. It covers any device that rotates at high speed such as a gyroscope, a reaction wheel, an inertia wheel, etc.

By way of specific example, and without this limiting the scope of the invention in any way, the description assumes the preferred application of the invention, i.e. controlling the attitude of a satellite.

BACKGROUND OF THE INVENTION

In order to control the attitude of satellites, it is general practice to use a system of reaction wheels or of inertia wheels.

Such a system comprises three main portions, namely: a stator secured to a structure which is itself fixed within the satellite; a rotor spinning at high speed about an axis; and means for driving the spinning portion, i.e. the rotor.

In older systems, the rotor rotates about a solid shaft, i.e. a rotary shaft with ball bearings or a similar member.

In more recent systems, use has been made of a technique that is more advantageous, implementing suspension by means of a magnetic and/or electromagnetic bearing under servo-control.

The rotary portion, i.e. the rotor, is spaced apart from the stator by clearance that is typically a fraction of a millimeter in normal operation.

The main advantage conferred by this technique lies in the fact that the rotor "floats" and thus rotates under magnetic levitation without coming into contact with the stator.

A priori there is no friction, or at worst friction is very low. As a result losses due to friction are also extremely low and wear is virtually non-existent.

Furthermore, and unlike systems using shafts and ball bearings, there are no harmful effects resulting from the need to lubricate such members: lubrication deteriorates over time, in particular on long-duration missions, it is sensitive to very low temperatures if they occur for very long periods, and/or to temperature variations that are fast and very large.

It may also be mentioned that magnetically suspended systems present levels of microvibration and of noise emission that are very low, and this is most favorable, in particular for scientific missions or for earth observations missions.

Until recently and in spite of the advantages they provide, such systems, which are of relatively large size, have been used only for missions of long duration, and they have been installed only on satellites that are likewise of large dimensions. Progress specifically in miniaturization and in large-scale integration of the electronic circuits for the above-mentioned servo-control has made it possible to greatly reduce the size of such systems, thereby enabling them to be integrated in satellites of small size, and in particular for short missions.

By way of non-exhaustive example, a magnetically suspended wheel is described in the article by Michael Scharfe et al. entitled "The challenges of miniaturization for magnetic bearing wheel", published in "Proc. 9th European Space Mechanisms and Tribology Symposium", ESA-SP-480, Sep. 19–21, 2001, pp. 17–24. That article refers in particular to work carried out at the Dresden Institute of Precision Engineering. Reference can advantageously be made to that article for a more detailed description, and in particular by referring to its FIG. 3 which is a diagram showing an example of a magnetic suspension.

In spite of the advantages recalled above, magnetic suspension systems nevertheless present at least one drawback.

The rotor is not rigidly connected to the stator, but on the contrary it is free to move both in parallel with and orthogonally relative to its axis of rotation, even if the amplitude of such movement is limited. As a result it is only (electro) magnetic forces that act on the rotor to keep it in a suitable three-dimensional position and to prevent it from coming into contact with the stator. In the absence of such forces, there is a risk of damage to the various members, both static and rotary.

Thus, it is general practice to provide an emergency mechanical bearing so as to enable the rotor to bear against the stator without the magnetic suspension members coming into mechanical contact while the rotor is not magnetically suspended.

Nevertheless, while the system is being subjected to high levels of stress, e.g. during launching of a satellite (intense vibration, acceleration, etc.), the above-mentioned emergency mechanical bearing is insufficient for withstanding the effects of those stresses without damage, it naturally also being understood that the magnetic suspension cannot be put into operation while the satellite is being launched.

It is therefore necessary to provide additional members that serve to lock the rotor completely relative to the stator. Under other circumstances, it is also necessary to lock the rotor, in particular while the system is being transported or handled.

Such locking must naturally be only temporary. In particular, after launch or when it is desired to perform tests on the system to ensure that is operating properly, it is necessary to unlock the rotor and to begin a stage of "normal" operation (under magnetic suspension).

Various solutions are provided for this purpose in the prior art. Most such solutions rely on the presence of a "consumable" component in the system, i.e. a component for single use only. It is the component which serves to lock the rotor temporarily relative to the stator. It will readily be understood that that solution presents a major drawback. The component needs to be replaced each time it has been used.

After it has performed its function, i.e. once the satellite has been launched and put into orbit, it is of no further use. Under such circumstances, the fact that the component is for single use only is not, a priori, a major drawback. Nevertheless, it should be observed that certain precautions need to be taken, since the above-mentioned component must not interfere with normal operation of the system (while it is under magnetic suspension).

In addition, and above all, the system is normally subjected to a certain amount of testing on the ground, and to intermediate handling operations. After each such test, it is therefore necessary to replace the single-use component. This generally also requires special maintenance operations to be performed that go beyond mere application of electrical or electronic controls.

Some of the main proposed solutions are summarized briefly below.

U.S. Pat. No. 4,345,485 (Jean-Luc Livet et al.) describes a locking mechanism in which the rotor is retained by temporarily eliminating the axial clearance between the rotor and an emergency mechanical bearing of the inertia wheel. The system has two emergency bearings each presenting a conical bearing surface capable of coming into mechanical contact with a complementary conical bearing surface made on the rotor. One of the complementary bearing surfaces can be caused to move axially. For this purpose, this bearing surface is associated manually with an axially sliding guide. In orbit, in order to release the rotor, the guide is sheared using shears controlled by a pyrotechnic charge. A spring acts on the rotor in order to retract it. The mechanism is thus a temporary locking device that acts axially.

U.S. Pat. No. 4,566,740 (Jean F. Beau et al.) describes a locking mechanism in which an axial cable is used for directly eliminating the axial clearance of a flywheel. The rotor is pressed against the surface of an emergency bearing where it is blocked. The rotor is released by using a pyrotechnic charge to cut the cable. That mechanism is likewise a temporary locking device that acts axially.

U.S. Pat. No. 4,872,375 (Hubert Vaillant de Guelis et al.) describes a locking mechanism using a cable that forms an annular loop in a plane extending transversely to the axis of rotation of the rotor. The cable acts radially on a plurality of individual radially-movable bearing surfaces associated with the stator. The rotor has a second radial bearing surface, and under the action of radial forces it engages in the bearing surfaces of the stator and becomes blocked. The rotor is released by means of a cable cutter. That constitutes a temporary locking device that acts radially.

As will readily be understood, all of those mechanisms are for single use only and therefore present the drawbacks outlined above.

A multiple-use mechanism is also known.

The article by U. Bichler and T. Eckardt entitled "A gimbaled low noise momentum wheel" published in "27th Aerospace Mechanisms Symposium", "NASA Conference Publication 3205", May 12–14, 1993, page 196 describes an inertia wheel having magnetic suspension and including a radially-acting pneumatic mechanism for locking the rotor. It comprises two rubber tubes as can be seen more particularly in its FIG. 4. The mechanism serves to lock the rotor by inflating the tubes with gas under pressure. In orbit, the rotor is released by means of valves that are actuated by solenoids. The multiple-use mechanism retains the rotor in a safe position during launch and during stages prior to testing.

A priori, it might be thought that that mechanism solves the problem of multiple use. It does not require a single-use component.

Nevertheless, experience shows that it is not without its own drawbacks. Specifically, firstly the tubes need to be refilled after each occasion the rotor is unlocked, and secondly, after a long period of storage, it is often found that it is also necessary to refill the tubes since they have become deflated due to residual leaks.

OBJECTS AND SUMMARY OF THE INVENTION

The invention seeks to mitigate the drawbacks of prior art devices for temporarily locking the rotor, some of which drawbacks are outlined above.

An object of the invention is to provide a device for temporarily locking a magnetically suspended rotor that enables the rotor to be locked and unlocked repeatedly, but without requiring the presence of single-use components.

To do this, according to a first important characteristic, the device of the invention for temporarily locking a rotor takes advantage of the properties of the so-called "Geneva" movement mechanism that is commonly used in clockmaking.

By way of non-exhaustive example, such a mechanism is illustrated and briefly described in "Encyclopedia Britannia" under the heading "Geneva mechanism".

The Geneva mechanism serves to obtain intermittent turning motion characterized by alternating periods of turning and of rest, without reversing direction. The mechanism is also used for indexing purposes, i.e. for turning through an angle of predetermined amplitude.

Figure 1:
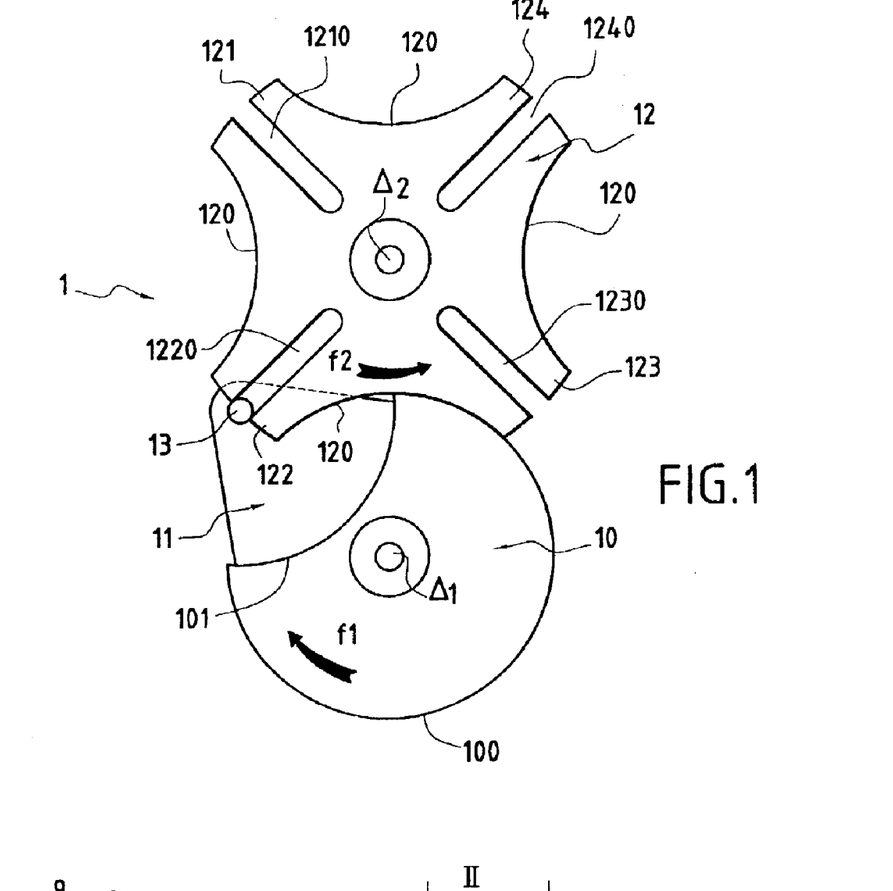
FIG. 1 is a diagram showing an embodiment of a so-called "Geneva" movement or mechanism.

FIG. 1 accompanying the present description is a diagram showing an embodiment of a Geneva movement mechanism 1.

The mechanism comprises two main portions: a drive cam 10 inscribed in a circle and turning about a first axis $\Delta_1$, e.g. in a clockwise direction as marked by arrow $f_1$; and a "Maltese" cross 12. The Maltese cross has a certain number of branches, typically four branches referenced 121 to 124, and is mounted to turn about a second axis of rotation $\Delta_2$, parallel to the first axis $\Delta_1$.

The cam 10 is turned by a motor or similar member (not shown).

The Maltese cross 12 presents a configuration such that between each of its branches 121 to 124 it is in the form of a circular arc 120 (a concave surface) that is complementary to the peripheral circle 100 in which the cam 10 is inscribed. The cam 10 and the Maltese cross 12 are disposed relative to each other in such a manner that their respective complementary peripheral surfaces 100 and 120 are engaged one in the other.

The cam 10 also has a hollow zone in its periphery: this zone presents a circular concave surface 101. This disposition allows the Maltese cross 12 to turn about the axis $\Delta_2$, and its arms 121 to 124 can engage one after another in said hollow zone 101.

In order to turn the Maltese cross 12, the following additional dispositions are adopted: each arm 121 to 124 has a radial slot (relative to the axis $\Delta_2$) 1210 to 1240, and the cam 10 itself carries an arm 11 whose end is provided with a finger 13 extending perpendicularly to the surface of the arm 11. The arm 11 and the finger 13 are arranged in such a manner that the finger engages in one or other of the slots 1210 to 1240. The cam 10 continuing to turn about the axis $\Delta_1$ in the direction of arrow $f_1$ causes the finger 13 to slide against the wall of one of the slots, e.g. the slot 1220 in FIG. 1, thereby turning the Maltese cross 12 about the axis $\Delta_2$ until the finger leaves the slot 1220. The Maltese cross 12 turns in the direction of arrow $f_2$, i.e. counterclockwise in the example described.

Because of the various dispositions implemented, in particular the presence of concave surface 120, when the cam 10 turns in one direction, the Maltese cross 12 turns in the opposite direction and it is prevented from returning, even if the cam 10 ceases to turn.

After the cam has made one complete revolution about the axis $\Delta_1$, the finger 13 engages in the following slot, 1210 in this example since the Maltese cross 12 has itself turned through 90°, and the cycle as described above is reproduced. Intermittent turning movement is thus obtained, even if the cam 10 rotates in regular manner. The amplitude of the angle turned through depends on the number of slots 1210 to 1240. Still in the example described, the Maltese cross 12 makes one complete revolution for every four revolutions of the cam 10.

As mentioned above, the invention advantageously makes use of the "irreversible" property of the rotary motion of the Maltese cross. The concept of "irreversibility" must naturally be understood for a given direction of rotation of the drive cam 10, since specifically if the motion of the cam itself is reversed, then it will drive the Maltese cross 12 in the opposite direction.

The invention also takes advantage of this additional property as described below.

Thus, the device of the invention for temporarily locking a rotor comprises a Geneva movement mechanism driven by an electrical actuator, e.g. a direct current (DC) electric motor. The Geneva movement mechanism supports an annular piece and is coupled to a screw member, e.g. a ball screw secured to the structure via a nut. The screw transforms the turning motion into compound motion having a linear component in a direction parallel to the axis of rotation of the rotor.

As a result, depending on the direction in which the motor turns, the annular piece is moved in translation in one direction or the other, thereby making it possible to move it towards or away from the rotor. When moved towards the rotor, it is possible to bring the annular piece into contact with the rotor and then to drive the rotor towards a fixed wall so as to obtain a self-blocking locked position for the rotor.

Release or unlocking is obtained just as easily, merely by reversing the direction of rotation of the motor.

In a preferred embodiment, the annular piece is provided with an elastic membrane which forms an integral portion thereof and which exerts a "pre-loading" force on the rotor.

Still in a preferred embodiment, the peripheral zones of the rotor and of the annular piece present complementary conical surfaces that engage one in the other.

Thus, the invention mainly provides a device for temporarily locking a rotor of the magnetically suspended type in an inertia wheel or the like, said inertia wheel comprising a stator secured to a structure and said rotor rotatable about an axis of rotation, said temporary locking device comprising a "Geneva" movement mechanism coupled to an actuator activated by a power source and suitable for driving it selectively in first and second directions of rotation, wherein:

said Geneva movement mechanism includes an inlet member of the cam type coupled to said actuator, an outlet member of the Maltese cross type possessing an axis of symmetry coinciding with said axis of rotation and turning about said axis;

said Maltese cross carries an annular piece and is coupled to screw means coaxial with said axis of rotation and suitable for transforming said turning notion into compound motion including a linear component so as to drive said annular piece in translation along said axis of rotation; and while said Maltese cross is turning in a first direction, said annular piece moves towards said rotor until mechanical contact is established therewith and drives it in translation so as to achieve blocking of the self-blocking type against a fixed wall so as to obtain said locking; and while said Maltese cross is turning in an opposite direction, said annular piece releases said rotor so as to obtain unlocking thereof.

The invention provides the use of such a device in an inertia wheel for controlling the attitude of an artificial satellite.

BRIEF DESCRIPTION OF THE DRAWINGS

The invention is described below in greater detail with reference to the accompanying drawings, in which.

MORE DETAILED DESCRIPTION

In the description below, and without this being limiting in any way on the scope of the invention, it is assumed, unless stated to the contrary, that the invention is in use in its preferred application, i.e. as a device for temporarily locking a rotor that enables repeated locking and unlocking operations to be performed on a magnetically suspended rotor of an inertia wheel or the like on board an artificial satellite for controlling attitude.

A preferred embodiment of a device of the invention is described below with reference to FIGS. 2A to 3.

In the figures, identical elements are given the same references and are described again only where necessary.

Figure 2A:
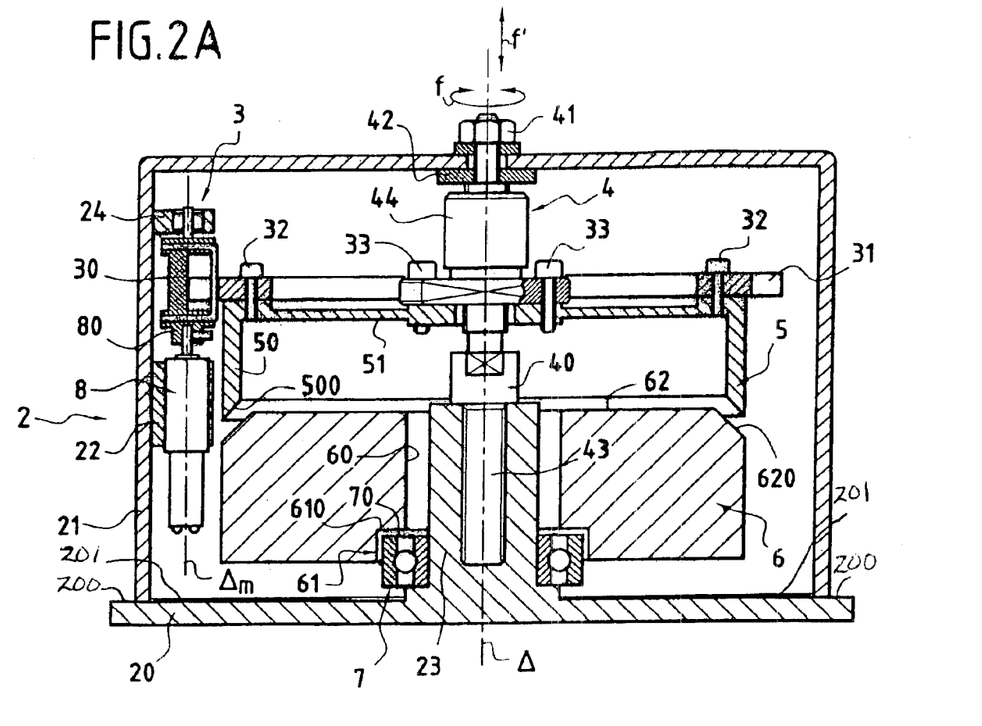
FIG. 2A is a diagrammatic cross-section in side view of an inertia wheel having a rotor of the magnetically suspended type and comprising a device for temporarily locking the rotor, constituting a preferred embodiment of the invention.

FIG. 2A is a side view in section of an inertia wheel of the type having a magnetically suspended rotor and comprising a device of this type. The figure shows only those elements which are needed for a good understanding of the invention. It should be understood that the inertia wheel and its various components do not differ from the prior art, and that the device of the invention is entirely compatible with prior art systems, this constituting an additional advantage. Only those dispositions which are specific to the invention and the interactions between the device for temporarily locking the rotor and the other members of the inertia wheel are described explicitly. By way of example, the members serving to drive the rotor and its magnetic suspension, the stator proper, and the control and regulation circuits are not shown. For a more complete description of the components of the circuits of a magnetically suspended rotor, reference can advantageously be made to the above-cited article by Michael Scharfe et al., for example.

The complete system 2, i.e. the inertia wheel, comprises a base 20 and a cover 21 which encloses the conventional component elements of such a system, and in particular a magnetically suspended rotor 6 that is a body of revolution. The rotor has a cylindrical central channel 60 and it is engaged on a solid shaft 23 forming part of the base 20 and having an axis of symmetry A, constituting the axis of rotation of the rotor 6.

In the example described, the bottom portion of the shaft 23 is provided with an emergency magnetic bearing 7. The face of the rotor 6 that faces the bearing 7 has a cylindrical cutout 61 of shape that is suitable for enabling the rotor 6 to become engaged at least in part on the bearing 7, the inside diameter of the cutout 6 nevertheless being slightly greater than the outside diameter of the bearing 7 so that in normal operation (i.e. under electromagnetic suspension), the rotor 6 does not come into mechanical contact with the bearing 7. In other words, this disposition serves to preserve a typical clearance of a fraction of a millimeter, as mentioned above, thus enabling the rotor 6 to float freely.

In the example shown in FIG. 2A, the rotor 6 is shown in its operational position, i.e. unlocked.

These dispositions are in themselves common with the prior art.

According to a first important characteristic of the invention, the device for locking and unlocking the rotor 6 comprises a Geneva movement mechanism given general reference 3. This mechanism is driven by an electrical actuator 8, preferably a DC motor. The motor 8 drives an inlet member 30, advantageously via a set of gears 80 having a determined gear ratio. The motor is powered in conventional manner by an electricity generator, together with control circuits which are not shown in FIG. 2A.

The Geneva movement mechanism 3 operates in a manner that is very similar to that described above with reference to FIG. 1, and there is no point in describing its operation again in full.

Figure 2B:
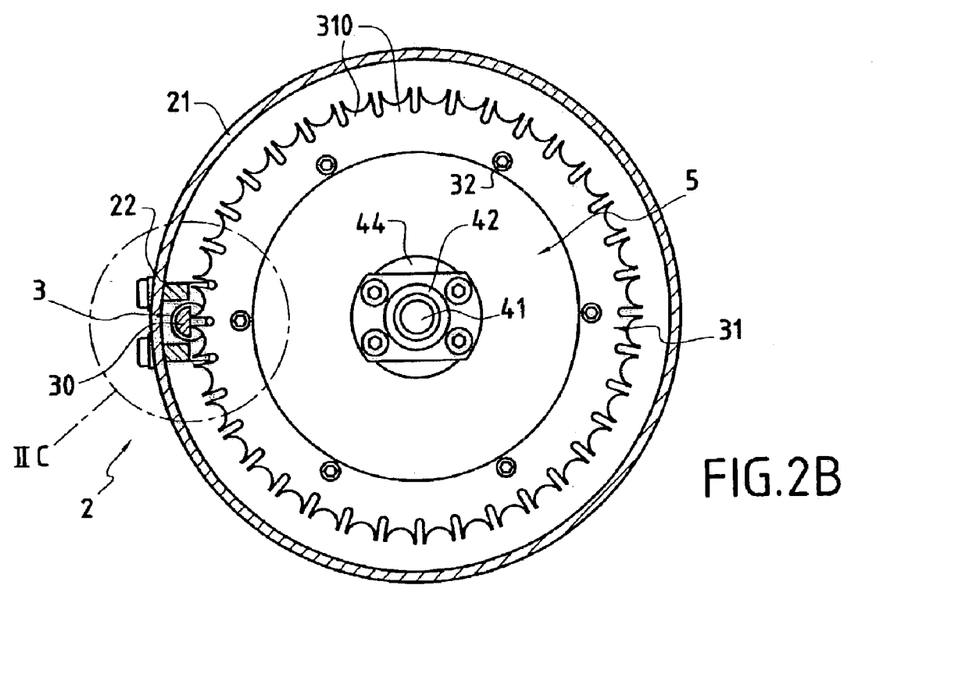
FIG. 2B is a diagrammatic section and plan view of the FIG. 2A device.
Figure 2C:
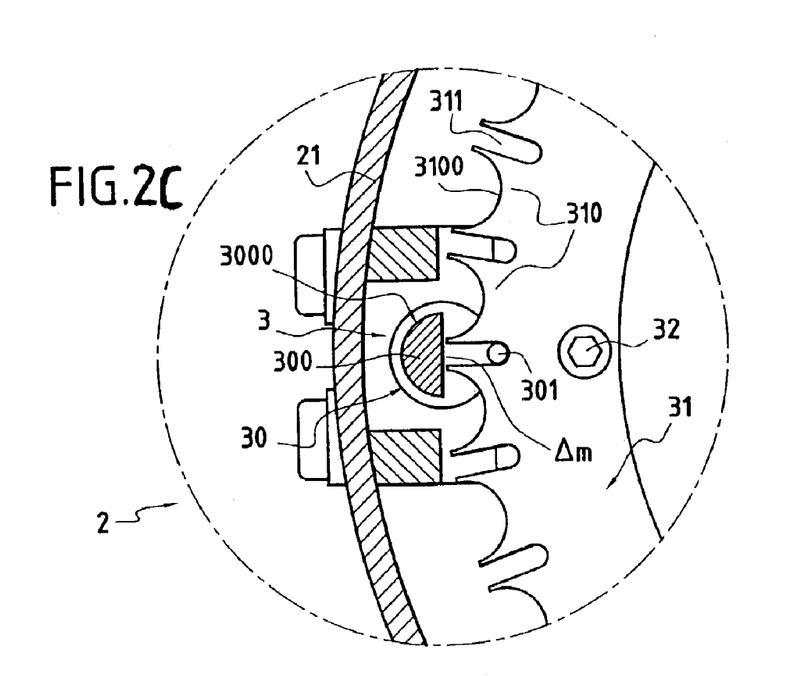
FIG. 2C shows a detail of FIG. 2B.
Figure 2D:
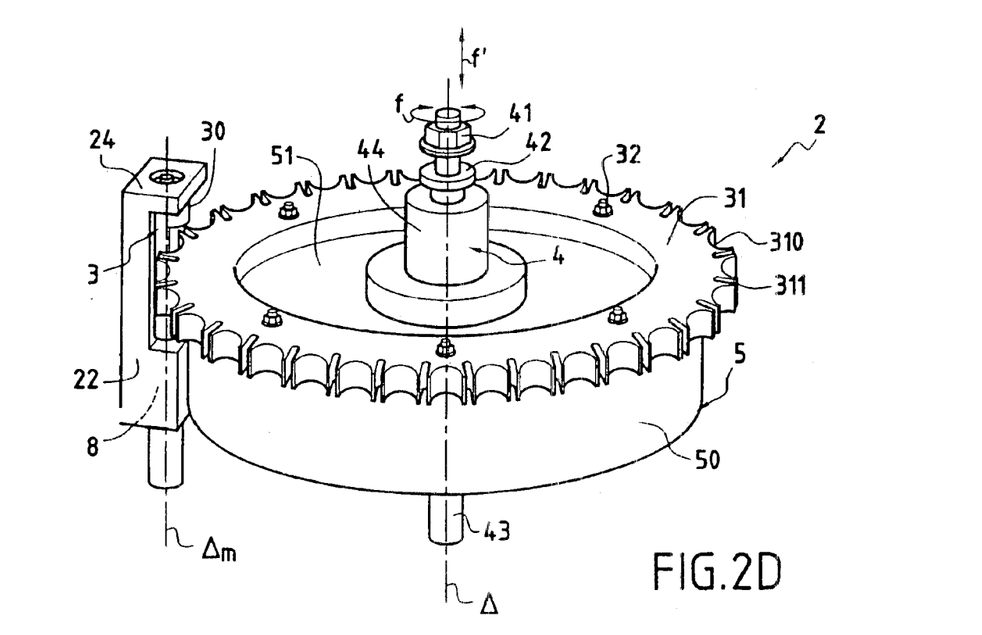
FIG. 2D is a fragmentary perspective view of a device in accordance with FIGS. 2A to 2C.

FIG. 2B (a plan view, partially in section), and more particularly FIG. 2C which shows a detail of FIG. 2B, and also FIG. 2D (a fragmentary perspective view) show the main members of the mechanism in greater detail.

The mechanism comprises an inlet member 30 having a cam 300 (similar to the cam 10 of FIG. 1) which turns a Maltese cross 31. In the example described, the Maltese cross 31 is constituted by a ring of teeth. Still in the example described, and in order to give a concrete example, the Maltese cross 31 comprises 36 teeth 310. The internal surfaces 3100 between pairs of teeth 310 of the ring, and the external surface 3000 of the cam 300 are complementary in shape (advantageously circular).

The teeth have radial slots 311.

The inlet member 30 supports a finger 301 perpendicular to the plane of the cam 300. As in the prior art device (FIG. 1), this finger engages in the slots 311 in turn in order to cause the ring constituting the Maltese cross to turn through an increment of 1/36th of a turn for each complete turn of the inlet member 30 about its own axis of rotation $\Delta_m$.

The Maltese cross 31 is caused to turn about an axis that coincides with the axis $\Delta$, i.e. the axis of rotation of the rotor 6.

The motor 8 and the inlet member 30 are secured to the cover 21 and rest on respective supports 22 and 24.

According to another important characteristic of the invention, the Maltese cross 31 is mechanically coupled to a threaded member given overall reference 4, and preferably comprising a ball screw 40. The ball screw has a shaft 43 that is secured to the shaft 23 at its bottom end (in FIG. 2) and it is secured to the cover 21 at its top end by any suitable means, e.g. a nut 41 or the like. Mechanical coupling with the Maltese cross 31 is implemented by way of example by means of a rotary nut 44 which is secured to the central portion of the Maltese cross 31 by means of screws 33 or similar members, and which is itself screwed onto the threaded portion of the ball screw 4.

The Maltese cross 31 is mechanically secured to an annular piece 5 in the form of a bell by means of screws 32 or similar members. This piece 5 is disposed beneath the Maltese cross 31 (in FIG. 2A).

When the Maltese cross 31 is driven by the inlet member 30 (by means of the cam 300 and the finger 301), it turns about the axis $\Delta$, thereby causing both the annular piece 5 and the nut 4 to turn also. The nut 4 transforms this turning motion of the assembly comprising the Maltese cross 31 and the annular piece 5 (arrow f) into compound motion possessing a linear component in translation along the axis $\Delta$ (arrow f'). The direction of the movement in translation depends on the direction in which the Maltese cross 31 is turned, and thus on the direction of rotation of the motor 8.

In a first direction of rotation of the motor 8 and the Maltese cross 31, the nut 4 is driven downwards (in FIG. 2A), such that the annular piece 5 initially moves towards the rotor 6, and subsequently comes into mechanical contact therewith, exerting a downwardly-directed thrust force, so as finally to block it against a bearing surface secured to the structure of the inertia wheel 2.

In the example shown in FIG. 2A, the top wall 610 of the cutout 61 in the rotor 6 is pressed against the top wall 70 of the emergency bearing 7. When the motor 8 is no longer powered electrically, and because of the above-recalled irreversible property of the Geneva movement mechanism 3, the rotor 6 is locked in self-blocking manner without requiring any energy to be expended.

In a preferred embodiment, the periphery of the top face 62 of the rotor 6 and the bottom of the cylindrical wall 50 of the annular piece 15 are provided with complementary conical bearing surfaces 620 and 500 respectively, thereby facilitating relative positioning of these two elements and positive locking when they come into mechanical contact during the above-described movement in translation.

In addition, still in a preferred embodiment, resilient means are provided that form an integral portion of the annular piece 5. In the example described, the resilient means are obtained by providing the annular piece 6 and in particular its top wall 51 with an appropriate shape giving it the properties of an elastic membrane. This elastic membrane 51 deforms progressively and serves to exert a preliminary thrust force or "pre-loading" that acts on the rotor 6.

Naturally, other dispositions enabling an analogous result to be obtained could be used without going beyond the ambit of the invention.

As described above, and advantageously, in particular for emergency bearings of small dimensions (which constitutes one of the preferred applications of the invention), the backing surface for locking purposes is constituted directly by the emergency bearing 7. This bearing can withstand high levels of axial force while continuing to turn. As a result it makes it easier to apply a pre-loading force of predetermined amplitude for a given application, which force is associated with the amount the annular piece 5 has been rotated.

The mechanical contact serving to lock the rotor 6 at the end of the stroke of the annular piece 5 may be achieved by means other than the emergency bearing 7 without going beyond the ambit of the invention.

In the variant that is shown, it suffices to provide the base 20 with a top surface 200 made of a material having a low coefficient of friction, or at least coated in such a material, with such a backing surface being referred to as a "static" backing surface.

By way of non-limiting example, the top surface 200 (FIG. 2A) of the base 20 can be coated in a thin film 201 based on PTFE, or it may have a coating of molybdenum disulfide (MoS$_2$) applied thereto.

In the opposite direction, the rotor 6 can be released (i.e. unlocked) merely by reversing the direction of rotation of the motor 8. This causes the Maltese cross 31 to be driven correspondingly so as to turn in the opposite direction to before. As a result the assembly comprising the Maltese cross 31 and the annular piece 5 causes the nut 42 to turn, being driven not only in rotation (f) but also in translation (f'), thereby moving towards the top wall of the cover 21 until the nut 44 comes into mechanical contact against an abutment 42 secured to said top wall. During this movement in translation, in the opposite direction to the initial movement, the annular piece 5 releases the thrust force exerted on the rotor 6 and then moves away from it. The rotor 6 is thus released and returns to an operational position (magnetically suspended), and full unlocking is obtained.

It can be seen that multiple locking and unlocking actions can be performed at will merely by reversing the direction of power supply to the motor 8. These operations do not require a single-use component nor do they require human interaction and/or complex and expensive maintenance operations.

A simple control circuit enables the desired operation to be achieved. FIG. 3 is a diagram of a circuit 9 for controlling and powering the motor 8. The circuit essentially comprises a DC generator 90, a double-pole double-throw (DPDT) switch 91 having a first position I (continuous lines) and a second position II (dashed lines) serving to reverse the polarity of the electrical power supply to the motor 8 by virtue of crossed conductors 93, thus enabling a current i to flow in a first direction (continuous arrow) or in the opposite, second direction (dashed arrow), thereby causing the shaft 81 of the motor to rotate clockwise or counterclockwise, respectively. Electronic control circuits 92 deliver a signal $V_c$ for controlling the two-state switch 91. Although the switch 91 is shown in the form of metal contacts, it could naturally and advantageously be implemented in the form of a semiconductor switch. In conventional manner, the control circuit 92 may be placed under the control of an on-board stored-program computer which determines the timing of locking and unlocking operations at appropriate instants. By way of example, a remote control radio signal may be transmitted from a terrestrial base in order to initiate unlocking after the satellite launch stage.

From the above, it can readily be understood that the invention achieves the objects it set out to achieve.

As shown above, it makes it possible to perform multiple locking and unlocking operations without human interaction and without requiring maintenance. The extra cost of the circuits and components needed to obtain this advantageous operation is negligible. It should in any event be observed that such a device is necessary and that prior art devices give rise to greater cost since they require single-use components to be used and/or expensive maintenance operations. Furthermore, the device is not particularly complex to operate.

Figure 3:
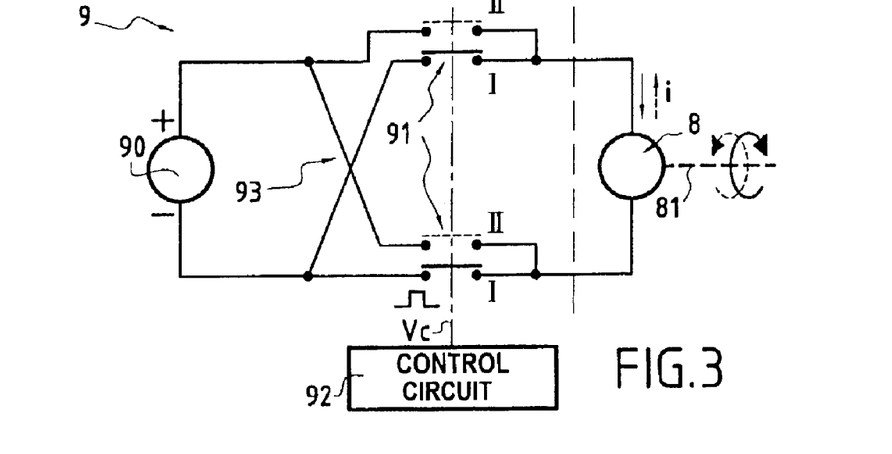
FIG. 3 is a diagram of an electrical power supply and control circuit implemented in the FIG. 2 device.

Nevertheless, it should be clear that the invention is not limited merely to the embodiments explicitly described, in particular with reference to FIGS. 2A to 3. Nor is the invention limited to the sole application to an inertia wheel for controlling the attitude of an artificial satellite.

What is claimed is:

1. A temporarily locking device for temporarily locking a rotor of the magnetically suspended inertia wheel, said inertia wheel comprising a stator secured to a structure and said rotor rotatable about an axis of rotation, said temporary locking device comprising a Geneva movement mechanism coupled to an actuator activated by a power source and suitable for driving said mechanism selectively in first and second directions of rotation, wherein:

said Geneva movement mechanism includes an inlet member of the cam type coupled to said actuator, a Maltese cross outlet member having an axis of symmetry coinciding with said axis of rotation and turning about said axis;

an annular piece carried by said Maltese cross, said Maltese cross being coupled to a screw member coaxial with said axis of rotation and adapted to transform said rotary motion into compound motion including a linear component so as to drive said annular piece in translation along said axis of rotation; whereby, while said Maltese cross is turning in first direction, said annular piece moves toward said rotor until mechanical contact is established therewith and drives said annular piece in translation so as to lock the rotor against a fixed wall so as to obtain a self-blocking locked position for the rotor; and while said Maltese cross is turning in an opposite direction, said annular piece releases said rotor so as to obtain unlocking thereof.

2. A device according to claim 1, wherein said screw member comprise a ball screw having a bottom shaft, said bottom shaft having an axis corresponding to said axis of rotation said shaft having a first end secured to said structure and a second end of said shaft being fast with said structure, wherein said rotor is engaged around said shaft and rotates freely thereabout, and wherein a nut secured to said Maltese cross is screwed on said ball screw so as to transform said rotary motion about said axis of rotation into compound motion presenting said linear component.

3. A device according to claim 1, wherein said actuator is a DC electric motor powered by an electricity source via control and switching circuits, so as to selectively reverse the polarity of the electrical power supply to said motor and selectively obtain rotation in a clockwise direction or in an opposite direction, respectively, whereby the electric motor drives said Maltese cross correspondingly and causes said Maltese Cross to turn in one direction or the other about said axis of rotation and said annual piece to move in translation along said axis of rotation in order to obtain locking and unlocking of the rotor respectively.

4. A device according to claim 1, wherein said annular piece is in the form of a cylindrical-walled bell, and it that the end of said cylindrical wall and the periphery of the facing face of the rotor having complementary conical bearing surfaces that engage one against the other when said rotor and said annular piece come into mechanical contact.

5. A device according to claim 4, wherein said annular piece incorporates an elastic membrane enabling a preloading force to be exerted while said annular piece and said rotor are coming together in order to obtain said locking.

6. A device according to claim 1, wherein said structure further comprises a mechanical bearing for emergency purposes, said fixed wall for blocking said rotor being constituted by one of the walls of said emergency mechanical bearing.

7. A device according to claim 1, wherein said fixed wall for blocking said rotor a low coefficient of friction.

8. A device according to claim 7, wherein said fixed wall for blocking said rotor is with a film of PTFE or a coating of molybdenum disulfide.

9. The use of a device for temporarily locking a rotor of a magnetically suspended inertia wheel for controlling the attitude of an artificial satellite, wherein said inertia wheel comprises a stator secured to a structure and said rotor rotatable about an axis of rotation, said temporary locking device comprising a Geneva movement mechanism coupled to an actuator activated by a power source and suitable for driving said mechanism selectively in first and second directions of rotation, wherein:

said Geneva movement mechanism includes an inlet member cam coupled to said actuator, a Maltese cross outlet member having an axis of symmetry coinciding with said axis of rotation and capable of rotation about said axis;

an annular piece carried by said Maltese cross, said Maltese cross being coupled to a screw member coaxial with said axis of rotation and adapted to transform said rotary motion into compound motion including a linear component so as to drive said annular piece in translation along said axis of rotation; whereby, while said Maltese cross is turning in a first direction, said annular piece moves towards said rotor until mechanical contact is established therewith and drives said annular piece in translation so as to lock the rotor against a fixed wall so as to obtain a self blocking locked position for the rotor, and while said Maltese cross is turning in an opposite direction, said annular piece releases said rotor so as to obtain unlocking thereof.

10. A device according to claim 9, wherein said screw member comprises a ball screw having a bottom shaft, said bottom shaft having an axis corresponding to said axis of rotation, said shaft having a first end secured to said structure and a second end being fast with said structure, wherein said rotor is engaged around said shaft and rotates freely thereabout, and wherein a nut secured to said Maltese cross is threaded on said ball screw so as to transform said rotary motion about said axis of rotation into compound motion presenting said linear component.

11. A device according to claim 9, wherein said actuator is a DC electric motor powered by an electricity source via control and switching circuits, connected to selectively reverse the polarity of the electrical power supply to said motor and selectively cause said motor to rotate in a clockwise direction or in an opposite direction, respectively, whereby the electric motor drives said Maltese cross correspondingly and causes said Maltese Cross to turn in one direction or the other about said axis of rotation and said annular piece to move in translation along said axis of rotation in order to obtain locking and unlocking of the rotor respectively.

12. A device according to claim 9, wherein said annular piece includes a cylindrical-wall bell having a bottom end, the bottom end of said cylindrical wall and the upper periphery of a facing face of the rotor having complementary conical bearing surfaces that engage one against the other when said rotor and said annular piece come into mechanical contact.

13. A device according to claim 12, wherein said annular piece incorporates an elastic membrane enabling a pre-loading force to be exerted while said annular piece and said rotor are coming together in order to obtain said locking.

14. A device according to claim 9, wherein said structure further comprises an emergency mechanical bearing for emergency purposes, said fixed wall for blocking said rotor being constituted by one of the walls of said emergency mechanical bearing.

15. A device according to claim 9, wherein said fixed wall for blocking said rotor has a low coefficient of friction.

16. A device according to claim 15, wherein said fixed wall for blocking said rotor is coated with a film of PTFE or a coating of molybdenum disulfide.

* * * * *

UNITED STATES PATENT AND TRADEMARK OFFICE
CERTIFICATE OF CORRECTION

PATENT NO. : 6,923,090 B2
DATED : August 2, 2005
INVENTOR(S) : Daniel Blonski and Rene Seiler It is certified that error appears in the above-identified patent and that said Letters Patent is hereby corrected as shown below:

Column 10,
Line 9, delete "turning" and replace with -- capable of rotation --.
Line 47, delete "and it that" and replace with -- having a bottom end, the bottom --.
Line 48, first word, delete "the".
Line 48, before "periphery", please insert -- upper --.
Line 64, before "with", please insert -- coated --.

Signed and Sealed this

Sixth Day of December, 2005

JON W. DUDAS
*Director of the United States Patent and Trademark Office*